United States Patent
Edwards

(10) Patent No.: US 10,282,884 B2
(45) Date of Patent: May 7, 2019

(54) INERTIAL DAMPING FOR ENHANCED SIMULATION OF ELASTIC BODIES

(71) Applicant: Ziva Dynamics Inc., Vancouver (CA)

(72) Inventor: Essex A. Edwards, Vancouver (CA)

(73) Assignee: Ziva Dynamics Inc., Vancouver (CA)

( * ) Notice: Subject to any disclaimer, the term of this patent is extended or adjusted under 35 U.S.C. 154(b) by 0 days.

(21) Appl. No.: 15/713,249

(22) Filed: Sep. 22, 2017

(65) Prior Publication Data

US 2018/0089878 A1    Mar. 29, 2018

Related U.S. Application Data

(60) Provisional application No. 62/400,365, filed on Sep. 27, 2016.

(51) Int. Cl.
| | | |
|---|---|---|
| *G06T 3/00* | (2006.01) | |
| *G06T 13/20* | (2011.01) | |
| *G06T 13/40* | (2011.01) | |
| *G06T 7/246* | (2017.01) | |

(52) U.S. Cl.
CPC ............ *G06T 13/40* (2013.01); *G06T 3/0006* (2013.01); *G06T 7/251* (2017.01); *G06T 13/20* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 2010/0033488 A1* | 2/2010 | Zhou | ................. | G06T 13/40 345/473 |
| 2010/0042266 A1* | 2/2010 | Barhen | ................. | C10M 171/00 700/304 |
| 2014/0002463 A1* | 1/2014 | Kautzman | ............... | G06T 13/40 345/473 |
| 2014/0188443 A1* | 7/2014 | Belyi | ................ | G06F 17/5009 703/2 |

OTHER PUBLICATIONS

"Ziva VFX Documentation—Ziva VFX 1.0 Documentation," Ziva Dynamics, 2017, 22 pages, [Online] [Retrieved on Oct. 19, 2017] Retrieved from the Internet<URL:https://docs.zivadynamics.com/vfx/>.

Jacobs, J. et al., "How to Build a Human: Practical Physics-Based Character Animation," DigiPro '16, ACM, Jul. 23-23, 2016, pp. 7-9, May be Retrieved at<URL:http://dl.acm.org/citation.cfm?id=2947698>.

* cited by examiner

*Primary Examiner* — YuJang Tswei
(74) *Attorney, Agent, or Firm* — Fenwick & West LLP

(57) ABSTRACT

Inertial damping is used to improve the simulation of deformable bodies for physics-based animation. Using this technique, undesirable dynamics of deformable bodies can be suppressed or completely removed while retaining other, more desirable dynamics. An inertial damping module selectively applies inertial damping to a subset of the dynamic modes of a simulated system (e.g., by using the quasi-static solution for these modes or reducing their magnitude). Thus, when the dynamics are simulated, the interactions between modes can be retained while the undesirable effects of the damped modes are reduced or eliminated. The results of the simulation are used to drive a physics-based animation.

20 Claims, 3 Drawing Sheets

INERTIAL DAMPING FOR ENHANCED SIMULATION OF ELASTIC BODIES

CROSS REFERENCE TO RELATED APPLICATIONS

This application claims the benefit of U.S. Provisional Application No. 62/400,365, filed Sep. 27, 2016, which is incorporated by reference in its entirety.

BACKGROUND

This disclosure relates generally to computer graphics, and more particularly to generating enhanced simulation results even when unrealistically high accelerations are provided as input to a simulation of elastic deformable bodies.

Physics-based animation uses physics to enhance traditional computer animation techniques. This presents the problem that traditional animation techniques do not always produce motions that are physically reasonable or possible. When such traditional animation techniques are used to drive a physics-based animation, the simulation's response may not be desirable. For example, when characters in movies accelerate too fast, their flesh should not be stripped from their bones, even if that is the physically correct result for such a situation.

DETAILED DESCRIPTION

Figure 1:
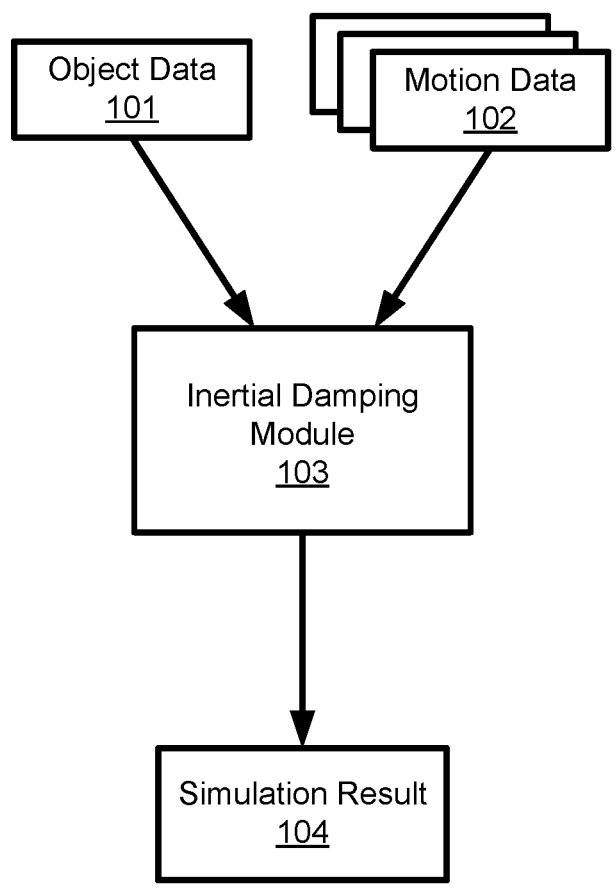
FIG. 1 is a block diagram of a system for simulating elastic or deformable bodies using inertial dampening, in accordance with an embodiment.

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures.

Overview and Benefits

The computer animation of graphics objects such as deformable bodies often requires coordinated motion configurations, each requiring multiple variables, e.g., position, orientation, and scale. Physics-based animation goes beyond the kinematic animation of traditional computer animation techniques through the use of fundamental physical principles. With physics-based animation techniques, users can create realistic motions by applying forces to physics-based animation models in a simulated physical world. A corresponding simulation process can automatically generate time-varying motion data, e.g., numeric values, for the simulation variables in accordance with the laws of physics.

As described above, applying physics-based simulations in scenarios that are extreme or impossible in the real world can lead to undesirable results. This disclosure describes "inertial damping," a technique to produce reasonable results even when unrealistically high accelerations are provided as input to a simulation of elastic deformable bodies. The inertial damping technique involves identifying particular modes of deformation, e.g., particular types of motion such as scale and translation, which capture undesirable accelerations, and eliminates inertia from the identified modes. Thus, physics-based simulation can be applied to make scenarios that are impossible in the real world appear more realistic than they actually are by selectively applying physics to modes and/or objects.

In various embodiments, the disclosed techniques generate enhanced and reasonable simulation results based on motion data associated with one or more deformable objects. This can provide a variety of advantages and benefits for computer animation, depending on the specific embodiment, such as maintaining dynamics of the motions of a deformable body, providing a stable simulation solution within the computational power of a computing device that performs the simulation operation, and providing physics-based animation using a simulation with an acceptable level of computation complexity.

In one embodiment, a simulation with inertial damping is performed by a computer with one or more processors. The computer accesses simulation data describing a system to be simulated, which includes a deformable body. The simulation data also describes one or more forces and/or one or more restraints acting on the deformable body. The computer determines a current state of the system based on the simulation data. A future state is determined from the current state by identifying a subset of dynamic modes of the system, applying inertial damping to the subset of the dynamic modes, and simulating the system based on the dynamic modes. The future state is provided for use in generating an improved physics-based animation of the system.

Example Systems

FIG. 1 is a block diagram of one embodiment of a system for simulating elastic or deformable bodies. In other embodiments, the simulation system contains different and/or additional elements. In the embodiment shown by FIG. 1, object data 101 includes information about one or more deformable objects to be simulated. The object data 101 for an object may include position, dimensions, shape of one or more elements, connections between those elements, one or more elastic constants (or other measures of how the object deforms when subject to force), and the like. Motion data 102 includes external forces and constraints acting on one or more of the deformable objects to be simulated. The object data 101 and motion data 102 collectively describe a system to be simulated and may collectively be referred to as simulation data. In some embodiments, the object data 101 and motion data 102 are not distinct data sets and are stored together. In such embodiments, the parts of the simulation data that describe the objects and forces/constraints may still be referred to as object data 101 and motion data 102, respectively.

An example of a deformable object is a human body, where motion-capture can supply the motion data 102. Motion data 102 can include numbers representing the motions of the deformable object in response to a force applied to the deformable body. The metadata (not shown) corresponding to the motion data 102 can include identifying information, such as an indication of the mode of the motion. In one embodiment, the motion data 102 are generated in response to a deformable object experiencing very high acceleration (e.g., above a threshold acceleration).

The motion data and, in some embodiments, associated metadata (not shown) are inputted into the inertial damping module 103, which generates enhanced and reasonable simulation results 104. The simulation results can then be used to drive a physics-based animation. For example, if the simulated deformable body is a human accelerating at a speed that would tear a real person apart, inertial damping can be applied such that the resulting animation shows the human's skin stretching, making the result seem more believable, even though the real world result would be a grizzly death. Operation of embodiments of the inertial damping module 103 are described in greater detail below.

Figure 2:
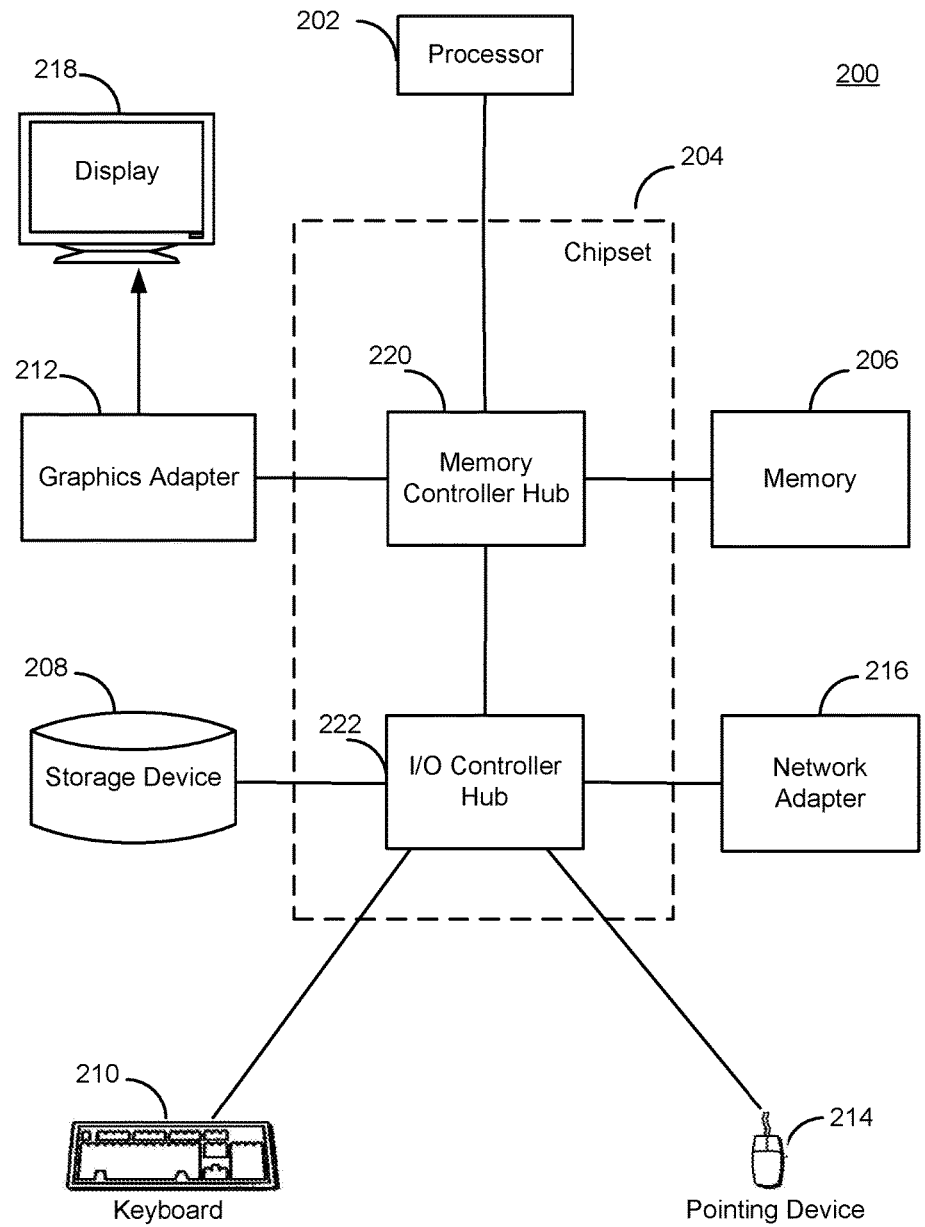
FIG. 2 illustrates a computer suitable for simulating elastic bodies using inertial dampening, according to one embodiment.

FIG. 2 is a high-level block diagram illustrating an example computer 200 suitable for animating objects using physics-based techniques with inertial dampening. The example computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

In the embodiment shown in FIG. 2, the storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, touch-screen, or other type of pointing device, and is used in combination with the keyboard 210 (which may be an on-screen keyboard) to input data into the computer system 200. The graphics adapter 212 displays images and other information on the display 218. The network adapter 216 couples the computer system 200 to one or more computer networks. The computer or computers used may lack some of these components, such as keyboards 210, pointing devices 214, or network adapters 216.

Examples of Inertial Damping

In one embodiment, a simulation of a system of one or more deformable bodies is based on the following second-order ordinary differential equation (ODE):

$$M \frac{\partial^2 u}{\partial t^2} = -\nabla \phi(u) \qquad (1)$$

where u is the state of the system (e.g., as determined from the object data 101 and motion data 102), M is the mass-matrix, t is time, and $\phi$ is the potential energy of the system. The inertial damping module 103 can solve this equation by providing an ODE integrator, such as Backwards Euler, one from the Backward Differentiation Formula (BDF) family, and others. Many such integrators can be written as $$u_{n+1} = \operatorname{argmin}_{u} \frac{\alpha}{2} \|u - u^*\|_M^2 + \phi(u) \qquad (2)$$

with different integrators corresponding to difference choices of $\alpha$ and $u^*$. For example, the backwards-Euler integrator corresponds to $\alpha = h^{-2}$ and $u^* = u_n + h v_n$, where h is the size of the timestep used.

One approach to solving equation 2 is to find the quasi-static solution, meaning the state the system would reach if it had time to settle on a local potential energy minimum. The quasi-static solution to the physical system represented in equations 1 and 2 is:

$$u_{n+1} = \operatorname{argmin}_{u} \phi(u) \qquad (3)$$

The advantages of the quasi-static approach are that it is quick, efficient, and independent of the velocity and acceleration of the kinematic components. Thus, the quasi-static result does not have the undesirable dynamics from unrealistic acceleration. Unfortunately, it also doesn't have the desirable dynamics, so the resulting physics-based animation will tend to look unrealistic. For example, to return the person who is undergoing extreme acceleration, the quasi-static solution will not result in the person being torn apart, but it will also not provide other desirable indicia of acceleration, such as the person's hair stretching out behind them.

Mixing Dynamic and Quasi-Static Approaches

Visually believable animations can be provided by a process of inertial damping, which mixes the quasi-static and dynamic approaches to solving equation 1. In various embodiments, the inertial damping approach solves some inertially damped components quasi-statically while solving other components dynamically. When the inertially damped components include the undesirable accelerations, they are eliminated without eliminating the rest of the dynamics.

To implement this, an inertial damping matrix, P, is defined with orthonormal columns spanning the damped modes. From this, a projected mass matrix can be defined with P in its nullspace:

$$\hat{M}(I-PP^T)^T M(I-PP^T) \qquad (4)$$

Thus, the inertially-damped dynamics are given by $$\hat{u}_{n+1} = \operatorname{argmin}_{u} \frac{\alpha}{2} \|u - u^*\|_{\hat{M}}^2 + \phi(u) \qquad (5)$$

Consequently, the elements of inertial damping matrix P can be used to reduce the magnitude of or completely eliminate modes that would otherwise lead to undesirable dynamics.

Choosing the Inertial Damping Matrix

In some embodiments, the deformable bodies are elastic bodies. An individual matrix ($P_i$) is defined for each body and the inertial damping matrix P is the concatenation of all the individual matrices. In one embodiment, $P_i$ for each object spans the space of all affine transformations of that object. That is, $P_i$ includes all translations (three dimensions) and linear transformations (nine dimensions), for a total of twelve dimensions. Thus, each $P_i$ is completely dense, but only 12 columns wide, so P is quite dense but very narrow (12N columns for N bodies) as typical simulations may have thousands of rows in P. Damping these twelve dimensions eliminates inertia from any translations or rotations of the object, which in turn eliminates a large class of non-physical accelerations.

Sparsity-Preserving Transformations

Because P is essentially dense in the embodiments described above, the resulting projected mass-matrix $\hat{M}$ will be large and dense. Thus, while equation 5 achieves the desired result, it can be challenging to work with in conjunction with direct linear solvers because of the computational power and memory requirements. In one embodiment, this is addressed by applying algebraic manipulation to transform the matrix into a sparser form. If $r=u-u^*$ and $q=P^T r \in R^{12N}$, then $$\|u-u^*\|_M^2 = \|r\|_M^2 \qquad (6)$$

$$= \|(I-PP^T)r\|_M^2 \qquad (7)$$

$$= \|r-Pq\|_M^2 \qquad (8)$$

This can be substituted into equation 5 to yield:

$$\hat{u}_{n+1} = \underset{r,q|q=P^T r}{\mathrm{argmin}} \frac{\alpha}{2}\|r-Pq\|_M^2 + \phi(u^*+r) \qquad (9)$$

The Karush-Kuhn-Tucker (KKT) conditions are the first-order necessary conditions for a solution of a function to be optimal. The KKT optimality conditions for equation 9 are:

$$\begin{bmatrix} M+\alpha^{-1}K & -MP & P \\ -(MP)^T & P^T MP & -I \\ P^T & -I & 0 \end{bmatrix} \begin{bmatrix} r \\ q \\ s \end{bmatrix} = \begin{bmatrix} -\alpha^{-1}\nabla\phi \\ 0 \\ 0 \end{bmatrix} \qquad (10)$$

where $K=\nabla\nabla\phi$ is the stiffness matrix for potential $\phi$ and s is a Lagrange multiplier for the constraint, $q=P^T r$. The matrix MP is the same size and has similar density to P. The matrix $P^T MP$ is very dense, but also very small. Overall, this form preserves the sparsity of M and P.

The system defined in equation 10 is a symmetric indefinite matrix. When K is a positive semi-definite matrix (as it commonly is), then the first two diagonal blocks are positive definite. The introduction of a constraint adds some complexity, but in a more general and realistic settings there are likely other constraints already. Solving this optimization problem can be done in any appropriate manner. For example, in one embodiment a line search applying Newton's method to determine the descent direction is used.

Generalizing and Applications

The majority of the discussion above has assumed the basic case where each mode is either subject to inertial damping and completely removed or it is left unchanged. However, in some embodiments, weighted damping is used to reduce but not completely eliminate modes. For example, in one embodiment, a weighting factor $\theta \leq 1$ is added to the constraint used in equation 9, making it $q=\theta P^T r$. In this way, the inertial damping can be smoothly transitioned on and off or partially applied. In other embodiments, more complex weighting factors are used. For example, $\theta$ can be a diagonal weight-matrix that individually controls how much each mode is damped. Thus, a different amount of inertial damping can be applied to each object within a simulation.

The techniques described above can also be adapted to systems with more complex dynamics. The dynamics need not be as simple as the second-order ODE of equation 1. For example, in various embodiments, constraints and first order differential terms (e.g., Rayleigh-damping) are included. If these are expressible as modifications to the optimization problem illustrated by equation 2, then the same derivation applies. However, even if these additional terms are not expressible as a modified optimization problem, the more elaborate dynamics will often result in a linear system similar to 10, and the inertial damping can be applied in a similar manner.

To give an example, an embodiment that incorporates position, velocity, and acceleration constraints requires solving:

$$M\ddot{u}+D(u)\dot{u}+f_{int}(u)+C_0^T l_0+C_1^T l_1+C_2^T l_2=f_{ext} \qquad (11)$$

subject to the conditions $$C_0 u+B_0 l_0=b_0 \qquad (12)$$

$$C_1 \dot{u}+B_1 l_1=b_1 \qquad (13)$$

$$C_2 \ddot{u}+B_2 l_2=b_2 \qquad (14)$$

and inertial damping terms analogous to those in system 10. Applying implicit backwards-Euler integration, this amounts to solving $$Ax=b \qquad (15)$$

where $$A = \begin{bmatrix} M+hD+h^2 K & -MP & \theta P & hC_0^T & hC_1^T & hC_2^T \\ -(MP)^T & P^T MP & -I & & & \\ \theta P^T & -I & 0 & & & \\ hC_0 & & & B_0 & & \\ hC_1 & & & & hB_1 & \\ hC_2 & & & & & h^2 B_2 \end{bmatrix} \qquad (16)$$

$$x = \begin{bmatrix} h^{-1} r \\ q \\ s \\ l_0 \\ l_1 \\ l_2 \end{bmatrix} \text{ and} \qquad (17)$$

$$b = \begin{bmatrix} h(f_{ext}-f_{int}(u_k))-(hK+D(u_k))v_k) \\ 0 \\ 0 \\ h^0(b_0-C_0(u_k+hv_k)) \\ h^1(b_1-C_1 v_k) \\ h^2(b_2) \end{bmatrix} \qquad (18)$$

with velocity $u_k = h^{-1}(u_k - u_{k-1})$ and $K=\nabla f_{int}(u_k)$. In view of the disclosure above, one of skill in the art will appreciate how to apply similar techniques to derive the minimization conditions that apply for other dynamic systems.

Example Methods

Figure 3:
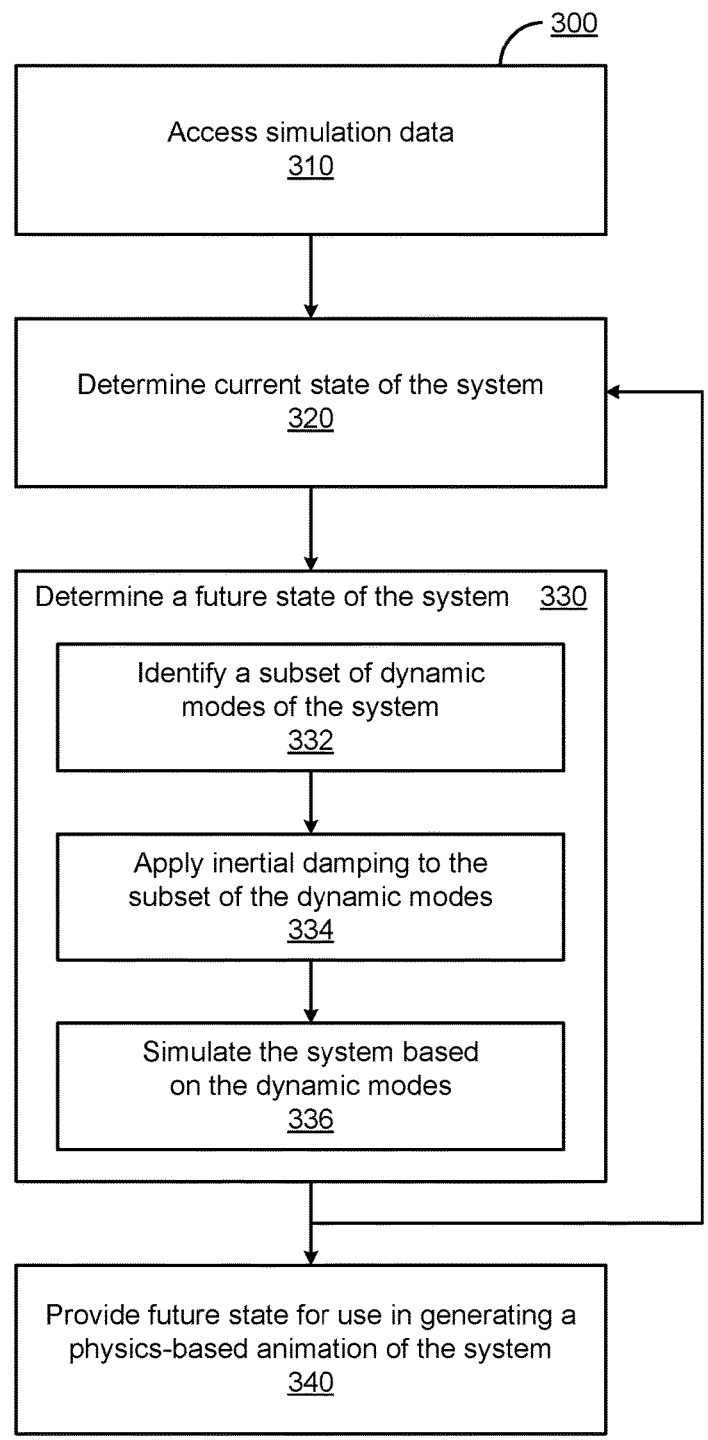
FIG. 3 is a flow-chart illustrating a method for simulating a system including a deformable body using inertial damping, according to one embodiment.

FIG. 3 illustrates a method 300 for applying inertial dampening in a physics-based animation, according to one embodiment. The steps of FIG. 3 are illustrated from the perspective of the inertial damping module 103 performing the method 300. However, some or all of the steps may be performed by other entities and/or components. In addition, some embodiments may perform the steps in parallel, perform the steps in different orders, or perform different steps.

The inertial damping module 103 accesses 310 simulation data. In one embodiment, the simulation data includes the object data 101 and motion data 102, as described previously. Based on the simulation data, the inertial damping module 103 determines 320 the current state of the system. If this is the first iteration of the simulation, the current state is an initial state that is provided by the user. In the second and later iterations, the future state generated by the previous iteration of the simulation is fed back into the method 300 as the current state.

The inertial damping module 103 determines 330 a future state of the system. In various embodiments, the future state is determined by running one iteration of the simulation algorithm used (e.g., as described above, with reference to FIG. 1). In the embodiment shown in FIG. 3, determining 330 the future state includes identifying 332 a subset of the dynamic modes of the system. For example, in the embodiment described above with regard to equations 4 and 5, the subset of dynamic modes are identified by the specific form of the inertial damping matrix selected. The inertial damping module 103 then applies 334 inertial damping to the selected subset of modes. For example, the quasi-static solution or partial damping may be used for these modes, as described above with reference to FIG. 1. The system in then simulated 336 based on the dynamic modes as adjusted by the inertial damping module 103. Thus, the simulation can retain interactions between damped and undamped modes. Regardless of the details of how it is determined, the future state is then provided 340 for use in generating a physics-based animation of the system (as well as fed back into the simulation as the current state for the next iteration, unless this is the last iteration of the simulation). Thus, the future state (and resulting animation) is based on a combination of inertially damped and undamped modes, allowing for undesirable dynamics to be suppressed while retaining desirable ones.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue.

I claim:

1. A computer-implemented method of providing improved simulation of deformable bodies using inertial damping for use in physics-based animation, the method comprising:

accessing simulation data describing a system to be simulated, the system including a deformable body and a force acting on the deformable body, wherein the simulation data includes a mass matrix, M;

determining a current state of the system based on the simulation data;

determining a future state of the system from the current state, determining the future state comprising:

identifying a subset of dynamic modes of the system;

applying inertial damping to the subset of the dynamic modes, wherein the inertial damping is based on a projected mass matrix defined as $\hat{M}=(I-PP^T)^T M(I-PP^T)$, where I is the identity matrix and P is an inertial damping matrix with orthonormal columns spanning the subset of the dynamic modes; and simulating the system based on the dynamic modes to determine the future state; and providing the future state of the system for use in generating a physics-based animation of the system.

2. The computer-implemented method of claim 1, wherein the subset of the dynamic modes that are inertially damped are solved quasi-statically.

3. The computer-implemented method of claim 1, wherein applying inertial damping comprises applying a first weighting factor to a first dynamic mode in the subset, the first weighting factor reducing the magnitude of the first dynamic mode.

4. The computer-implemented method of claim 3, wherein applying inertial damping further comprises applying a second weighting factor to a second dynamic mode in the subset, the second weighting factor different than the first weighting factor and reducing the magnitude of the second dynamic mode.

5. The computer-implemented method of claim 1, wherein the subset of dynamic modes includes all modes corresponding to affine transformations of the deformable body.

6. The computer-implemented method of claim 1, wherein algebraic manipulation is used to generate a sparse form of the projected mass matrix, and the sparse form of the projected mass matrix is used to apply the inertial damping.

7. The method of claim 6, wherein simulating the system comprises determining the future state using $$\hat{u}_{n+1} = \underset{r,\, q\,|\, q = P^T r}{\arg\min} \frac{\alpha}{2} \|r - Pq\|_M^2 + \varphi(u^* + r),$$

wherein $\hat{u}_{n+1}$ is the future state, $r=u-u^*$, u is a current state, $u^*$ and $\alpha$ are integrator parameters, and $\varphi$ is potential energy of the system.

8. A physics-based animation computing system comprising:

one or more processors;

a computer-readable medium storing simulation data describing a system to be simulated, the system including a deformable body and a force acting on the deformable body;

an inertial damping module that, when executed by the one or more processors, performs operations including:

determining a current state of the system based on the simulation data, wherein the simulation data includes a mass matrix, M;

determining a future state of the system from the current state, determining the future state comprising:

identifying a subset of dynamic modes of the system;

applying inertial damping to the subset of the dynamic modes, wherein the inertial damping is based on a projected mass matrix defined as $\hat{M}=(I-PP^T)^T M(I-PP^T)$, where I is the identity matrix and P is an inertial damping matrix with orthonormal columns spanning the subset of the dynamic modes; and simulating the system based on the dynamic modes to determine the future state; and providing a simulation result based on the determined future state; and a display configured to present a physics-based animation of the system based on the simulation result.

9. The physics-based animation computing system of claim 8, wherein the subset of the dynamic modes that are inertially damped are solved quasi-statically.

10. The physics-based animation computing system of claim 8, wherein applying inertial damping comprises applying a first weighting factor to a first dynamic mode in the subset, the first weighting factor reducing the magnitude of the first dynamic mode.

11. The physics-based animation computing system of claim 10, wherein applying inertial damping further comprises applying a second weighting factor to a second dynamic mode in the subset, the second weighting factor different than the first weighting factor and reducing the magnitude of the second dynamic mode.

12. The physics-based animation computing system of claim 8, wherein the subset of dynamic modes includes all modes corresponding to affine transformations of the deformable body.

13. The physics-based animation computing system of claim 8, wherein algebraic manipulation is used to generate a sparse form of the projected mass matrix, and the sparse form of the projected mass matrix is used to apply the inertial damping.

14. A non-transitory computer-readable storage medium storing computer program code for improved simulation of deformable bodies using inertial damping for use in physics-based animation, the computer program code, when executed, causing one or more processors to perform operations including:

accessing simulation data describing a system to be simulated, the system including a deformable body and a force acting on the deformable body;

determining a current state of the system based on the simulation data, wherein the simulation data includes a mass matrix, M;

determining a future state of the system from the current state, determining the future state comprising:

identifying a subset of dynamic modes of the system;

applying inertial damping to the subset of the dynamic modes, wherein the inertial damping is based on a projected mass matrix defined as $\hat{M}=(I-PP^T)^T M(I-PP^T)$, where I is the identity matrix and P is an inertial damping matrix with orthonormal columns spanning the subset of the dynamic modes; and simulating the system based on the dynamic modes to determine the future state; and providing the future state of the system for use in generating a physics-based animation of the system.

15. The non-transitory computer-readable storage medium of claim 14, wherein the subset of the dynamic modes that are inertially damped are solved quasi-statically.

16. The non-transitory computer-readable storage medium of claim 14, wherein applying inertial damping comprises applying a first weighting factor to a first dynamic mode in the subset, the first weighting factor reducing the magnitude of the first dynamic mode.

17. The non-transitory computer-readable storage medium of claim 16, wherein applying inertial damping further comprises applying a second weighting factor to a second dynamic mode in the subset, the second weighting factor different than the first weighting factor and reducing the magnitude of the second dynamic mode.

18. The non-transitory computer-readable storage medium of claim 14, wherein the subset of dynamic modes includes all modes corresponding to affine transformations of the deformable body.

19. The non-transitory computer-readable storage medium of claim 14, wherein algebraic manipulation is used to generate a sparse form of the projected mass matrix, and the sparse form of the projected mass matrix is used to apply the inertial damping.

20. The non-transitory computer-readable storage medium of claim 19, wherein simulating the system comprises determining the future state using $$\hat{u}_{n+1} = \underset{r,\, q\,|\,q = P^T r}{\operatorname{argmin}} \frac{\alpha}{2}\|r - Pq\|_M^2 + \varphi(u^* + r),$$

wherein $\hat{u}_{n+1}$ is the future state, $r = u - u^*$, u is a current state, $u^*$ and $\alpha$ are integrator parameters, and $\varphi$ is potential energy of the system.

* * * * *